Sept. 1, 1959  E. S. WOOD, JR  2,902,286
CONVERTIBLE BASSINET AND CHILD'S VEHICLE
Filed July 13, 1955  10 Sheets-Sheet 6
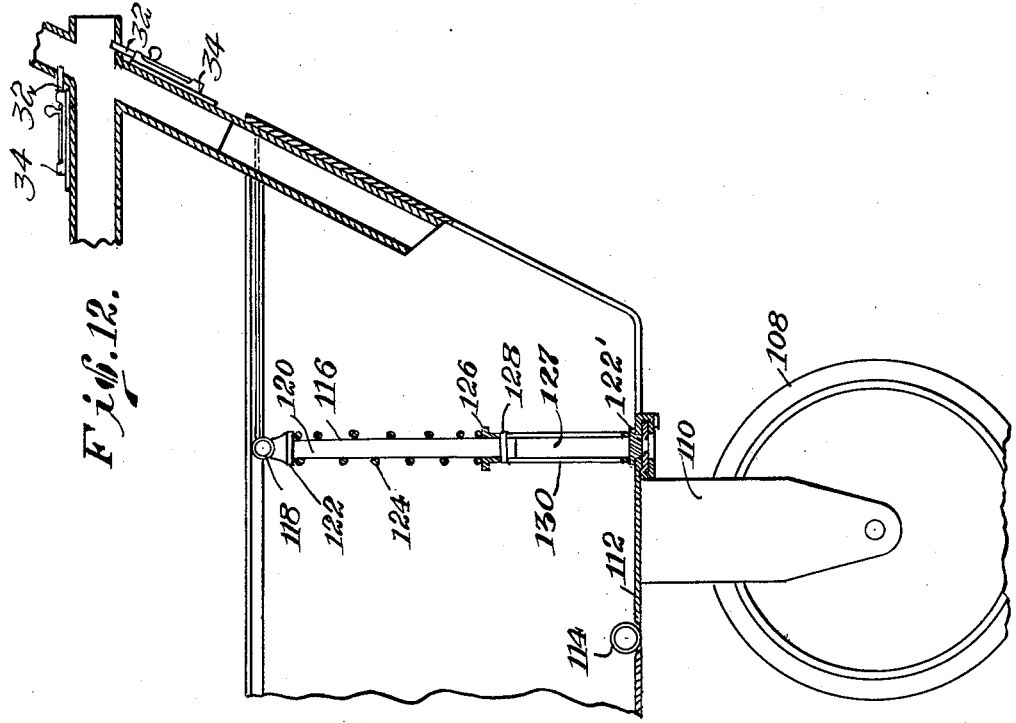
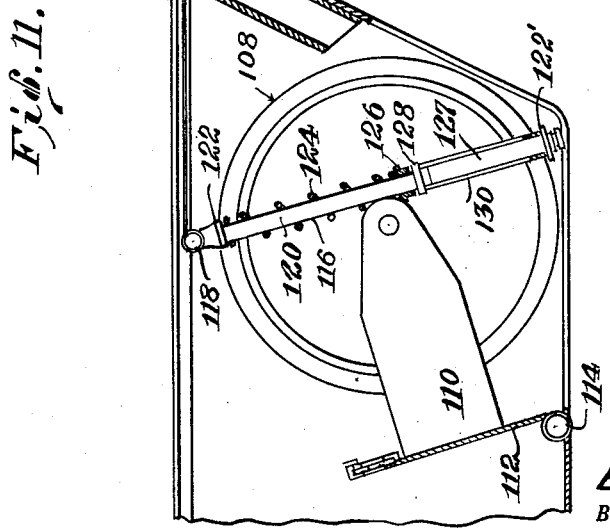
INVENTOR.
Elwood S. Wood Jr
BY
Attorney.

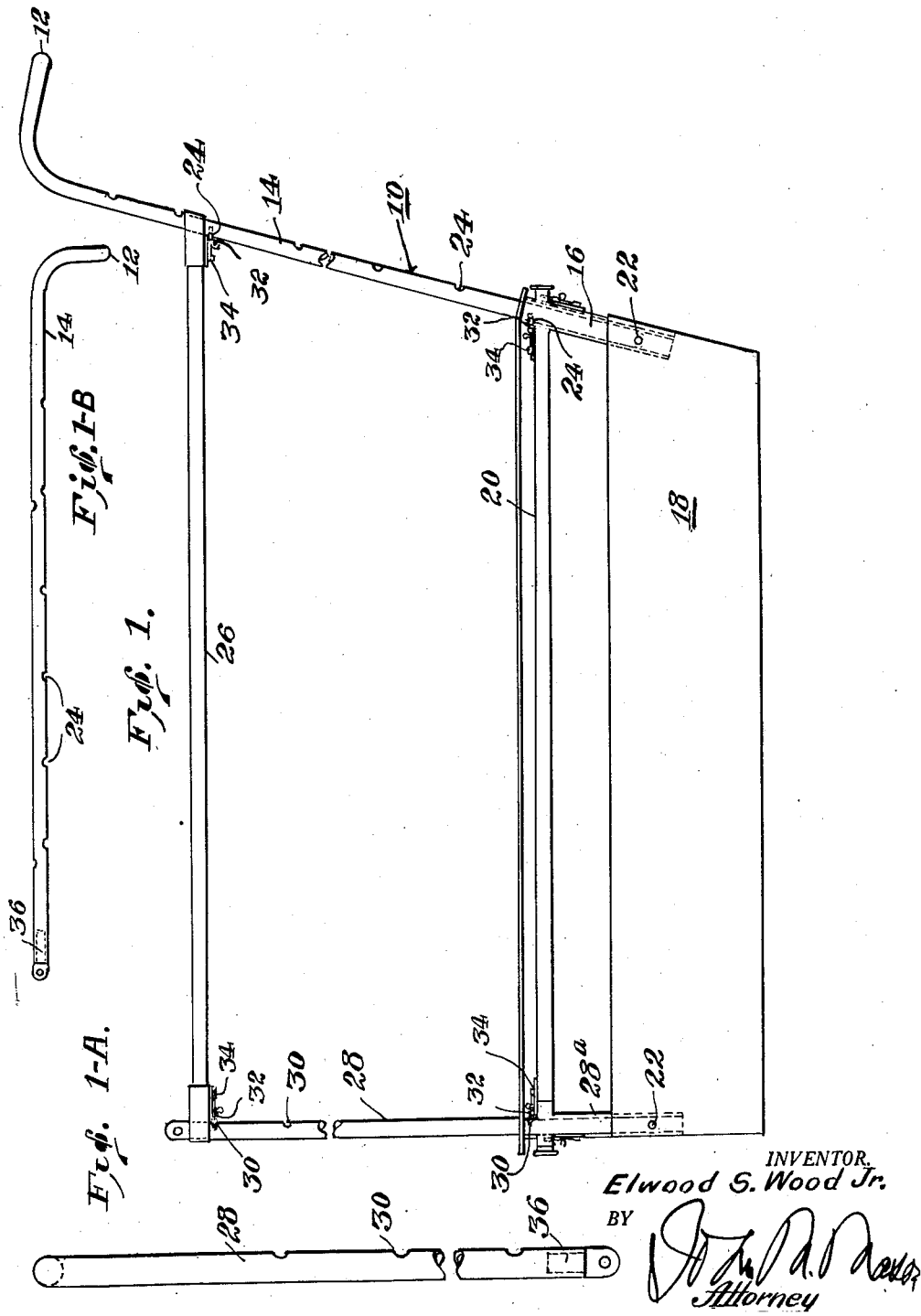

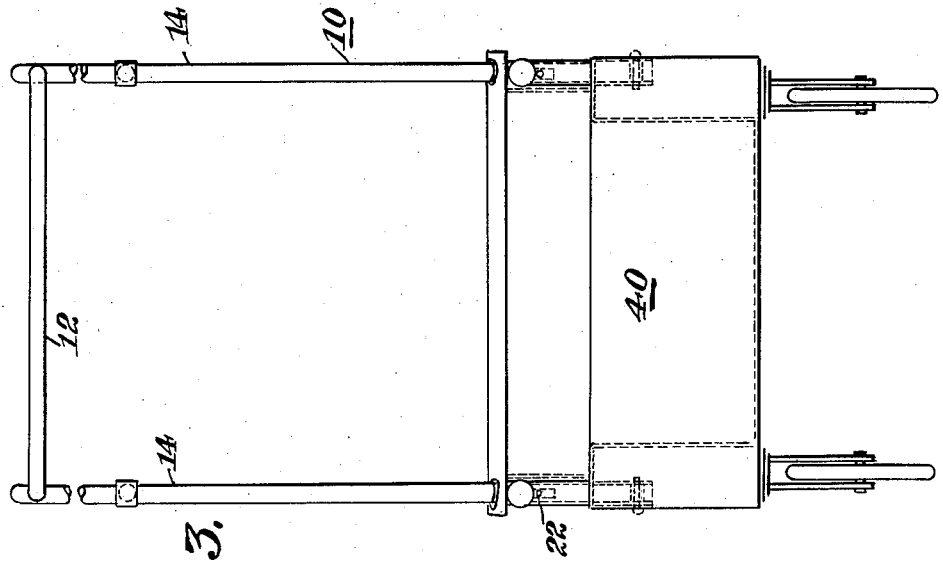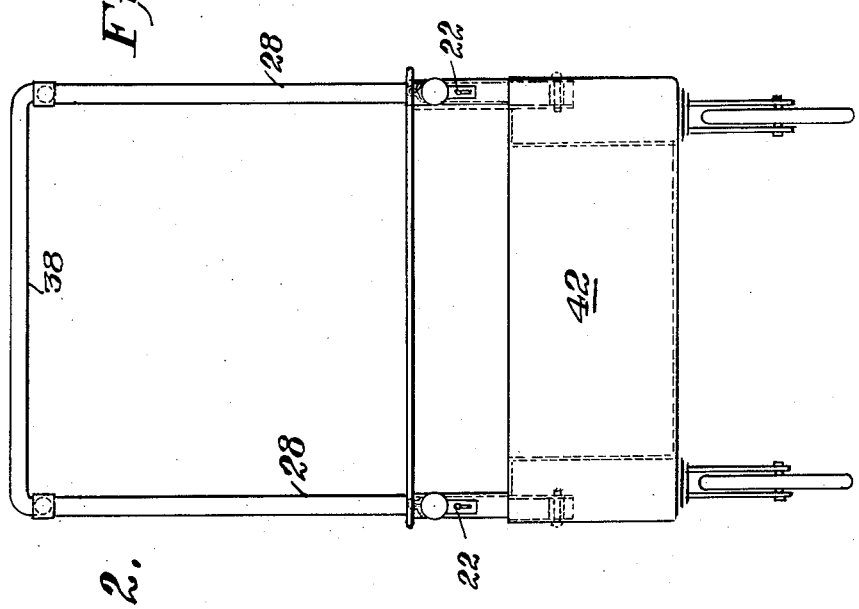

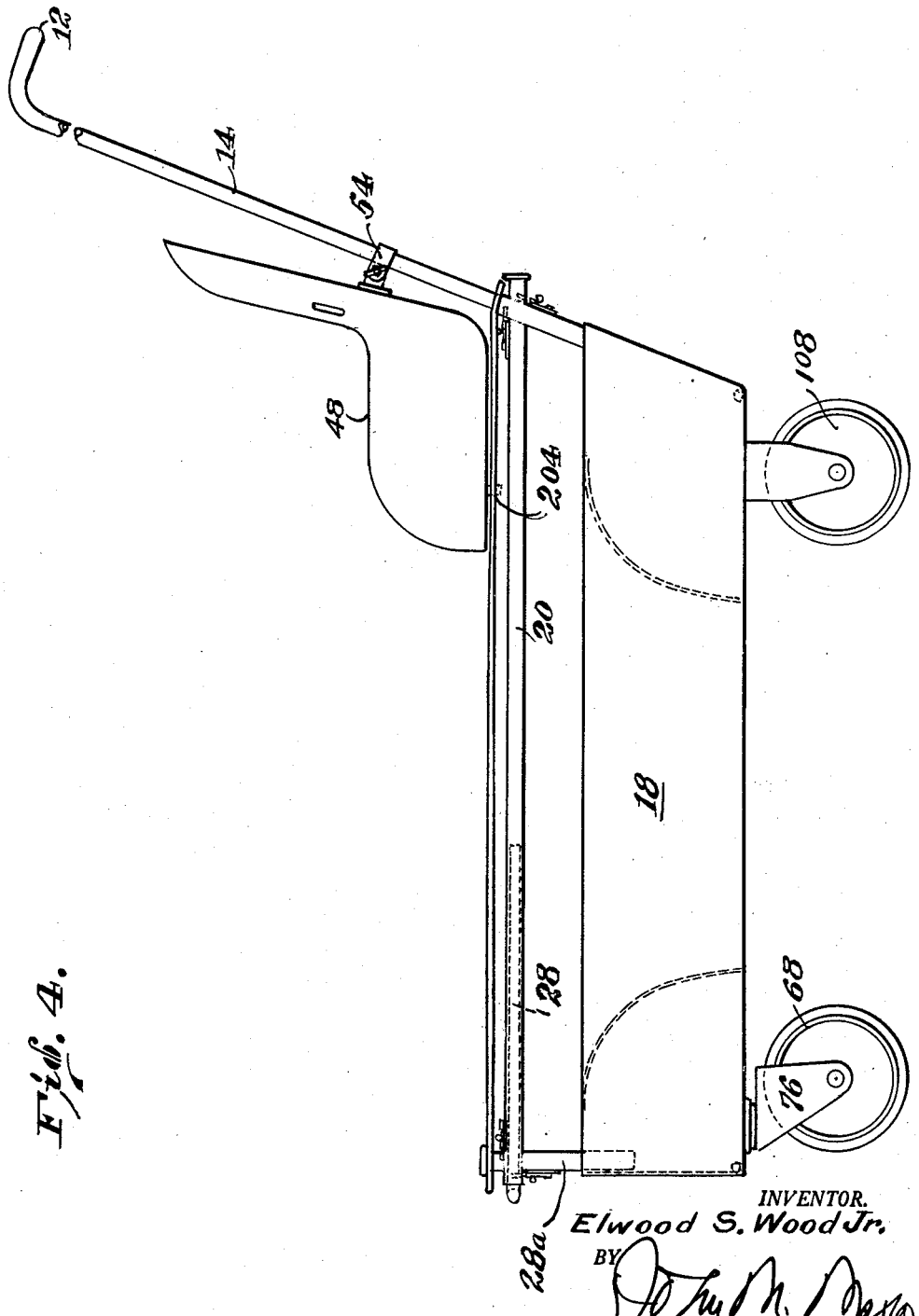

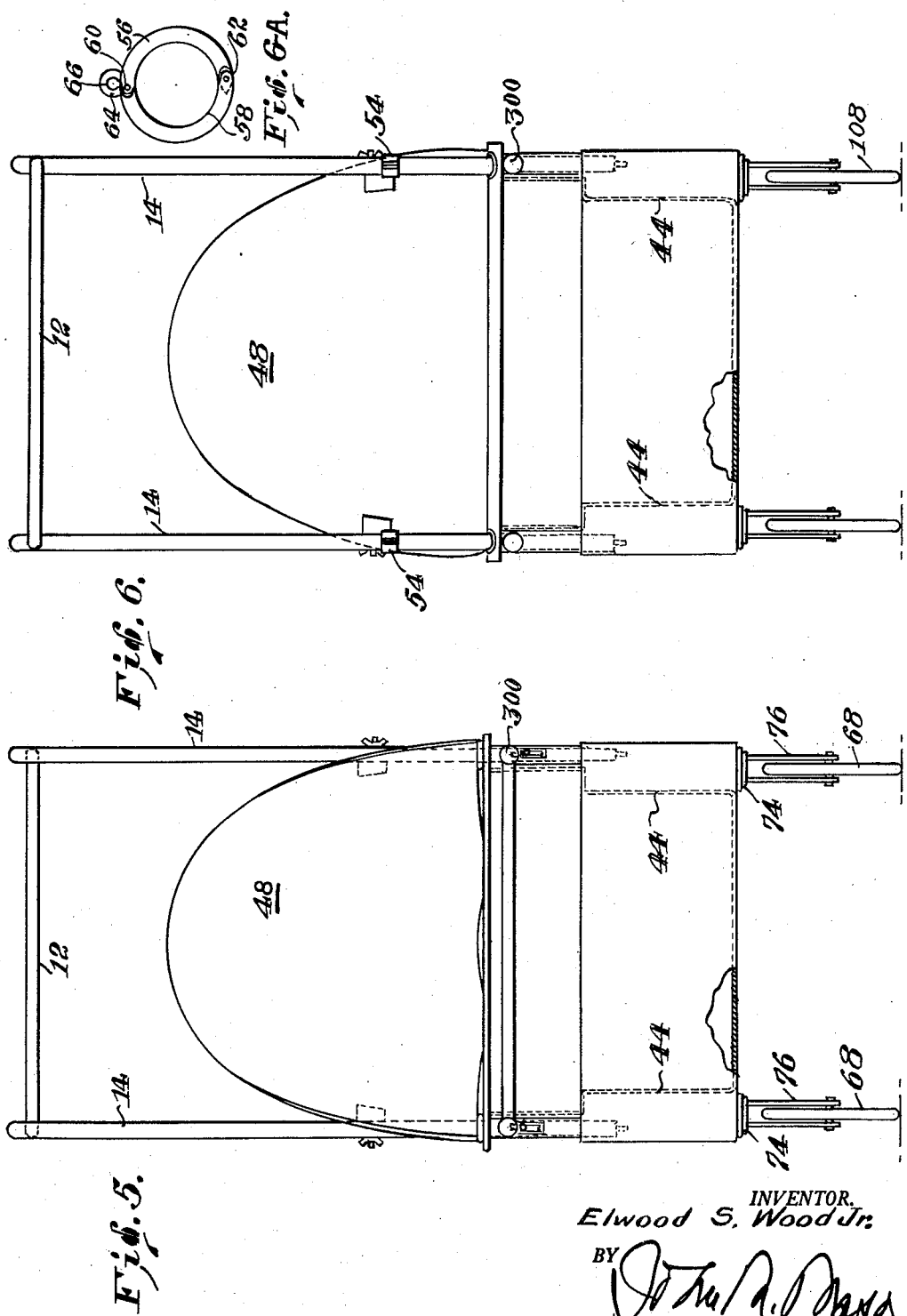

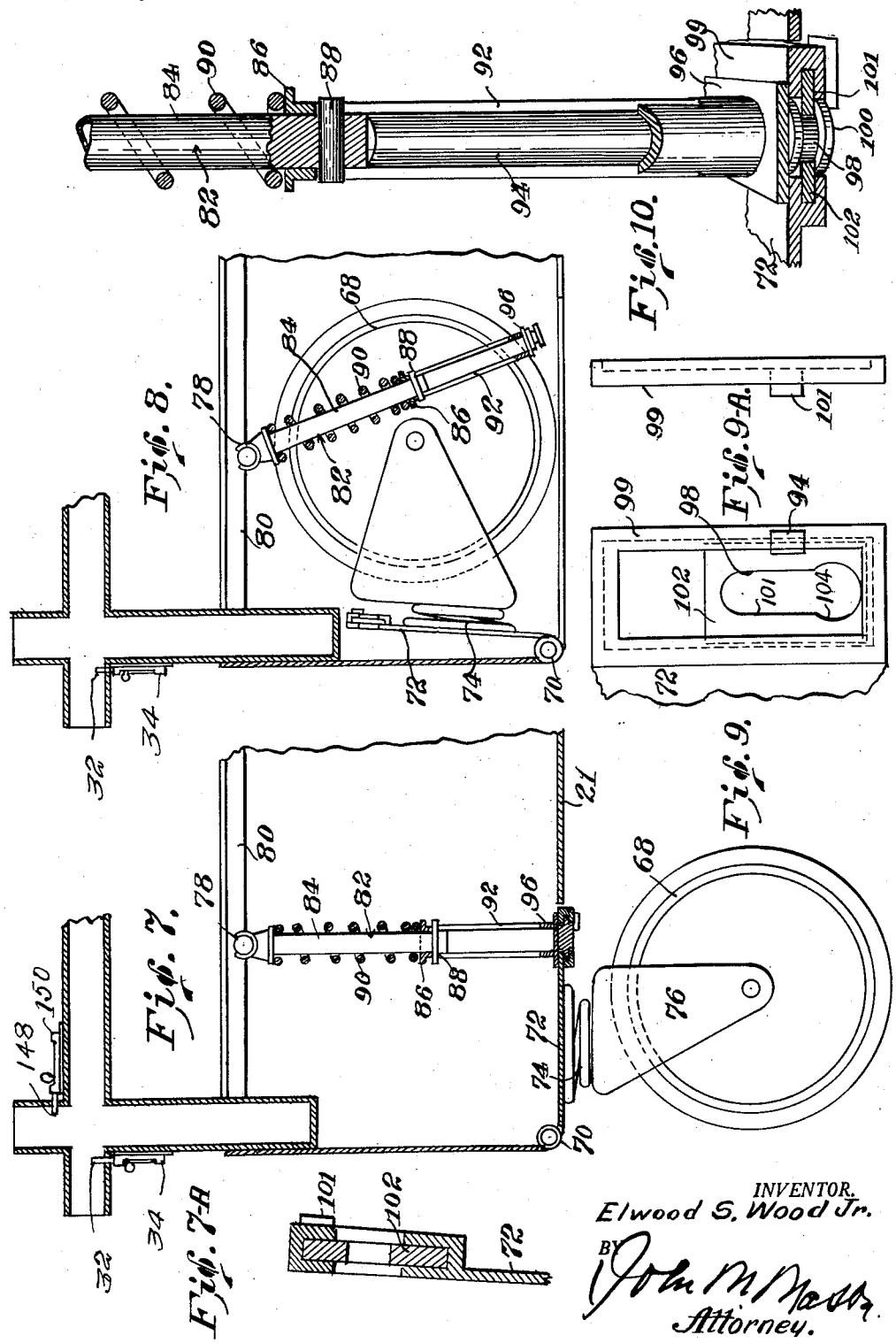

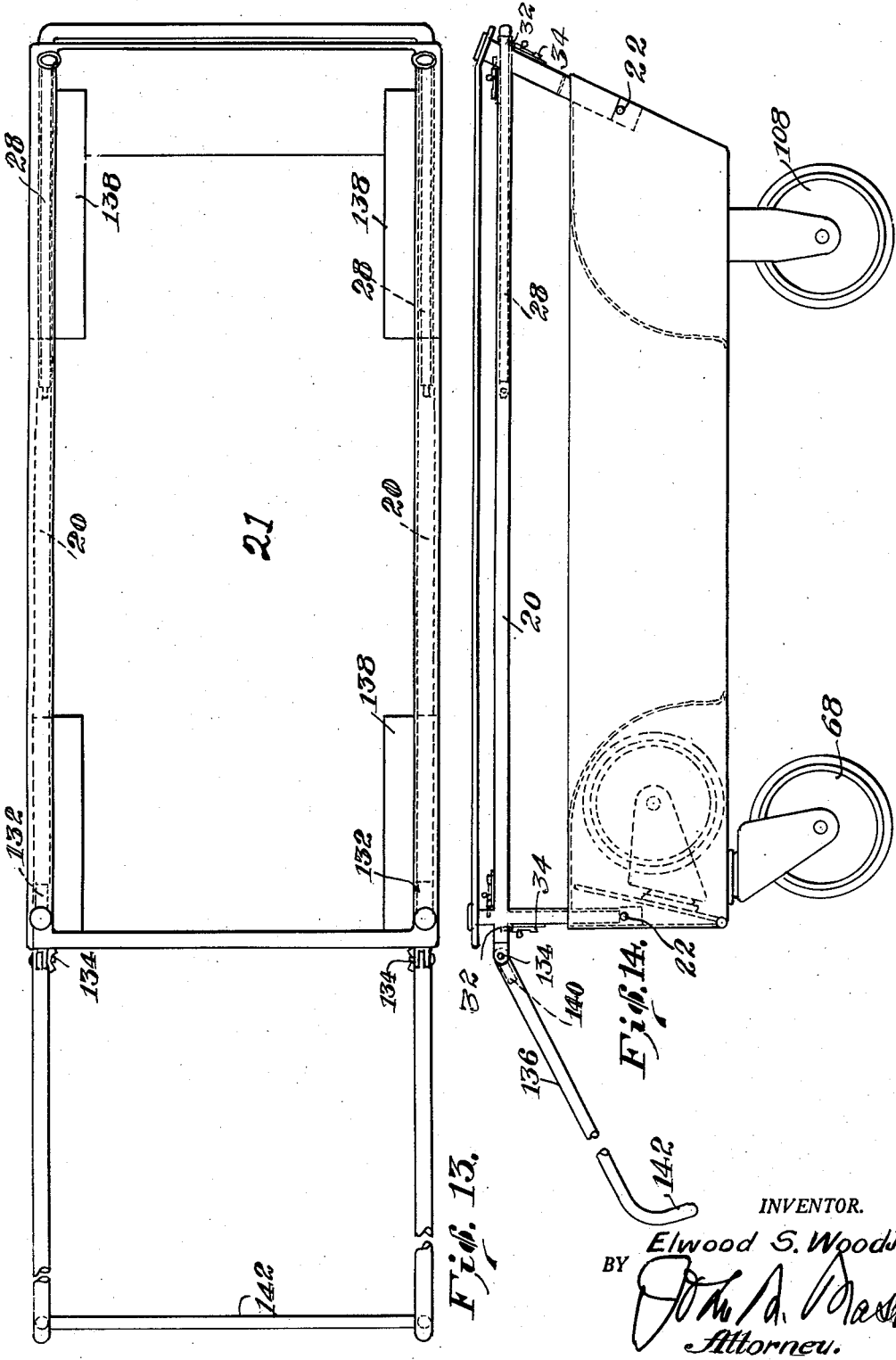

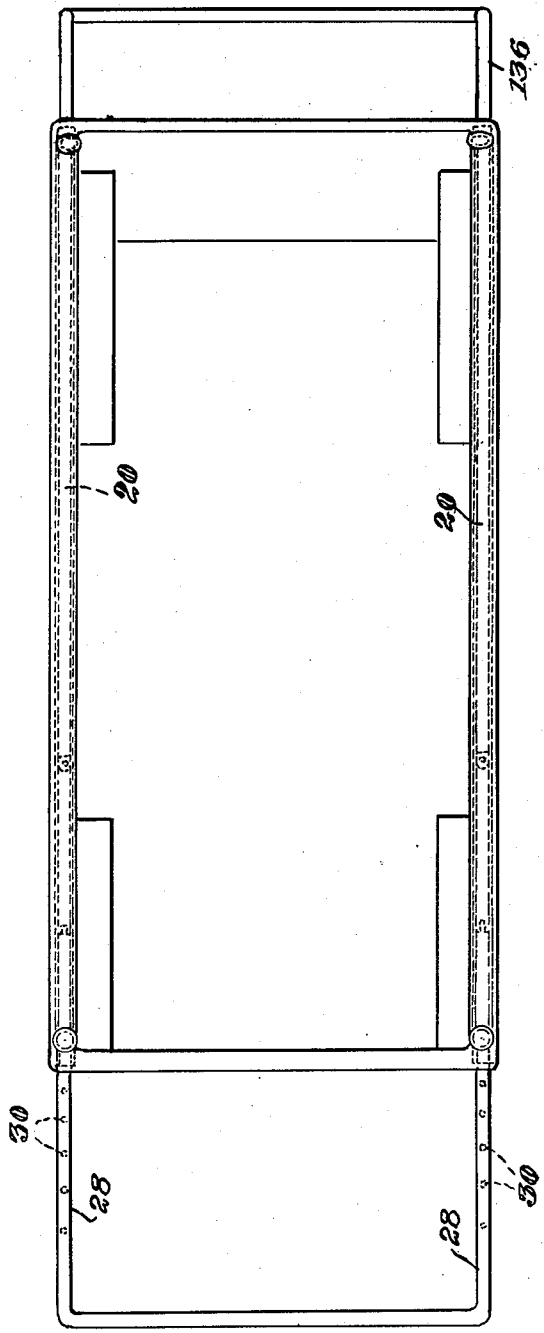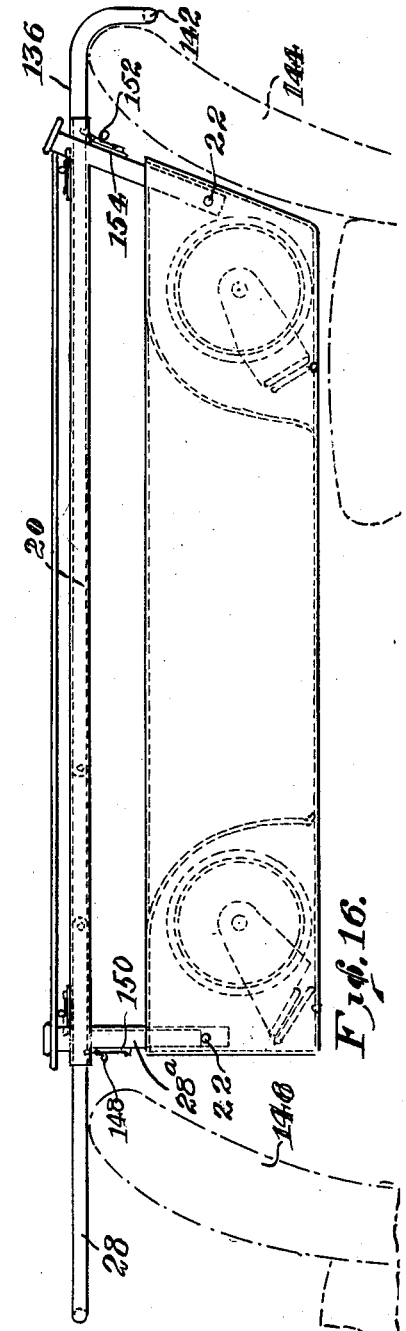

Sept. 1, 1959            E. S. WOOD, JR            2,902,286
CONVERTIBLE BASSINET AND CHILD'S VEHICLE
Filed July 13, 1955            10 Sheets-Sheet 9
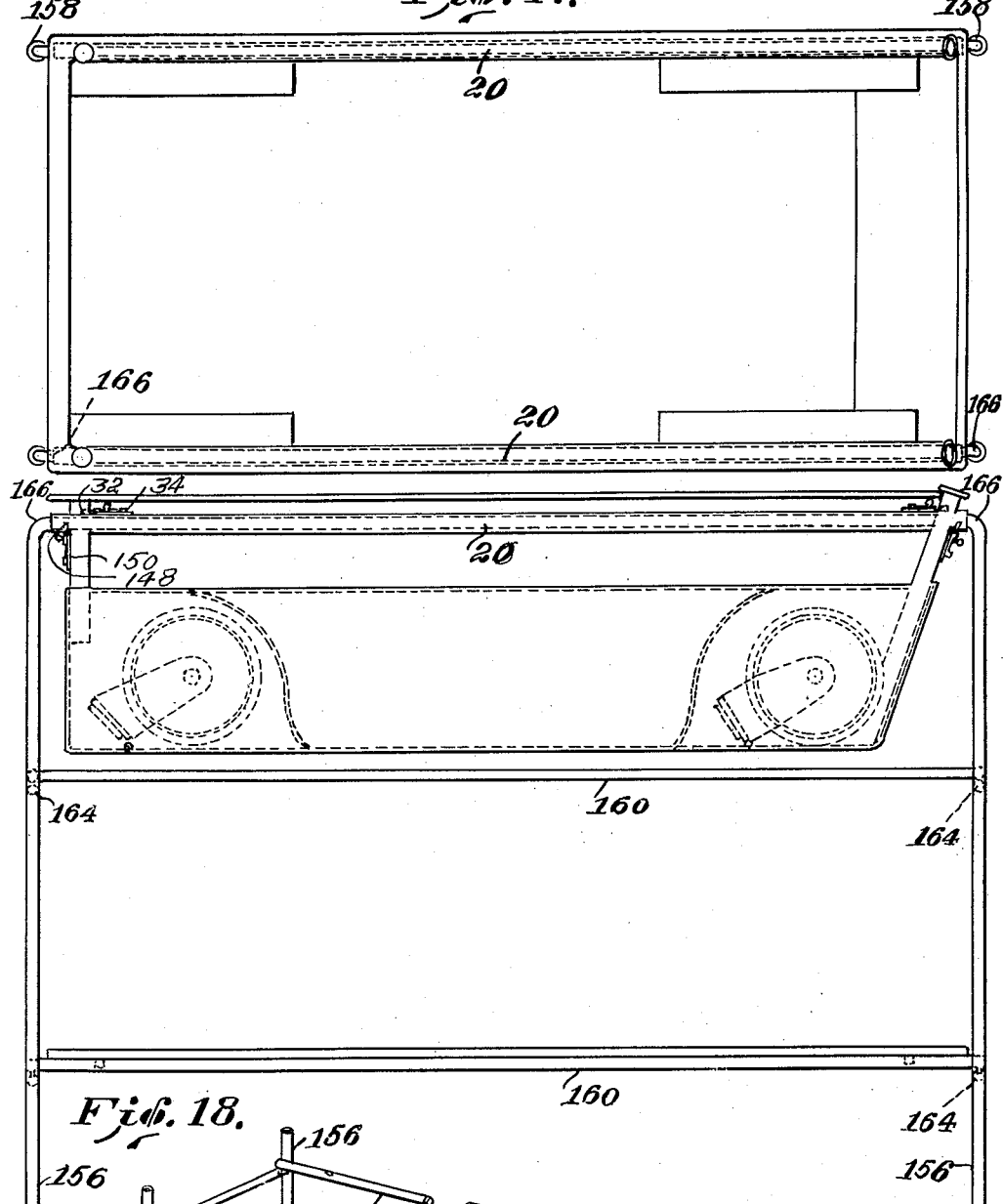
INVENTOR.
Elwood S. Wood Jr.
BY
Attorney.

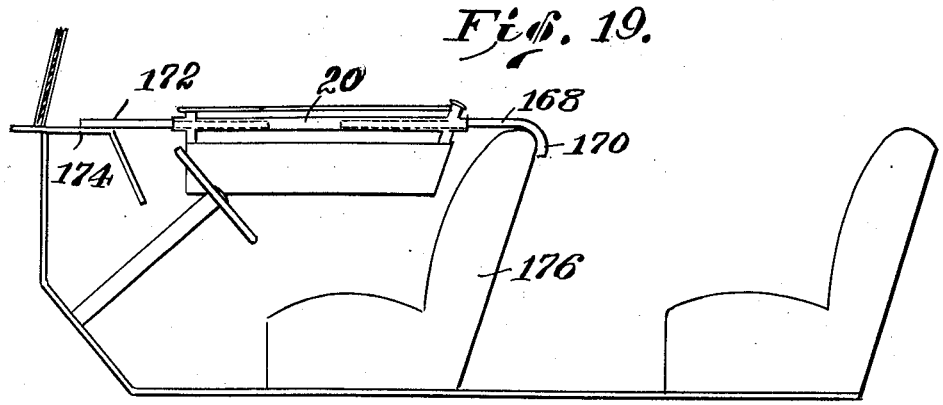
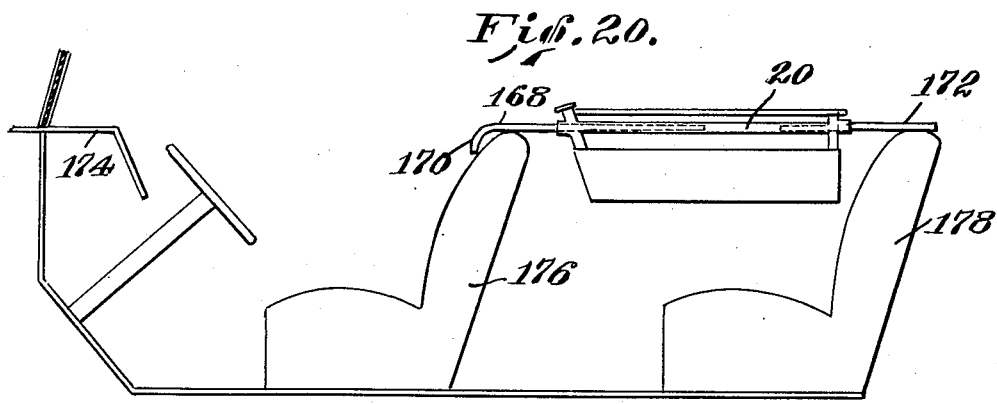

United States Patent Office 2,902,286
Patented Sept. 1, 1959

2,902,286

CONVERTIBLE BASSINET AND CHILD'S VEHICLE

Elwood S. Wood, Jr., Norfolk, Va.

Application July 13, 1955, Serial No. 521,751

11 Claims. (Cl. 280—31)

This invention relates to a combination structure for use by infants, and older children which may be converted to a bassinet, a car bed, a carriage, a stroller, a wagon or as a car seat attachment.

An object of the invention is to eliminate the necessity for purchasing different articles for holding infants or young children, including bassinets, carriages, etc., as the article when purchased for use by an infant may be converted for use by children who pass the infant stage.

In accordance with the foregoing object, an additional object is to provide a plurality of basic parts, and small accessory parts which may be purchased as needed whereby the device may be made into any one of the following, i.e., a bassinet, a car bed, carriage, stroller and wagon with a car seat attachment for an infant or young child.

An additional object is to convert the device from one article to another without the use of tools.

Other objects will appear hereinafter throughout the specification.

In the drawings:

Figure 1 is a side elevational view of the stroller or carriage with the wheels in a retractable position;

Figure 1A is a detail elevational view of the end support;

Figure 1B is a plan view of one handle of the structure shown in Figure 1;

Figure 2 is an end elevational view of the carriage shown in Figure 1 with the wheels in extended position;

Figure 3 is an end elevational view from the opposite end of the structure shown in Figure 2;

Figure 4 is a side elevational view of the stroller with the seat in place and the wheels in position for use;

Figure 5 is a front end view of the structure shown in Figure 4;

Figure 6 is the rear end or handle end view of the structure shown in Figure 4;

Figure 6A is a plan view or detail of the split ring for attaching a cover to the stroller;

Figure 7 is a vertical sectional view with parts in full lines of the wheel mounting, and showing the wheel in operative position;

Figure 7A is an enlarged transverse sectional view, partly broken away, of the wheel locking means;

Figure 8 is a view similar to Figure 7, but showing a wheel in inoperative position;

Figure 9 is a plan view of the wheel holding means;

Figure 9A is a side elevational view of the structure shown in Figure 9;

Figure 10 is an enlarged detail elevational view, partly broken away and partly in vertical section, of portions of the wheel retracting and holding means;

Figure 11 is an enlarged view, partly in vertical section of the rear wheel and its mounting when in retracted position;

Figure 12 is a view similar to Figure 11 but showing the wheel in its extending position and showing other parts of the stroller;

Figure 13 is a top plan view of the device when converted into a wagon;

Figure 14 is a side elevational view of the structure shown in Figure 13;

Figure 15 is a top plan view of the device when converted to a car bed;

Figure 16 is a side elevational view of the structure shown in Figure 15 applied between automobile seats;

Figure 17 is a top plan view of the device when converted to a nursery bassinet;

Figure 18 is a side elevational view of the structure shown in Figure 17;

Figure 18A is an exploded view, partly in section, of the frame and mattress support of the bassinet;

Figure 19 is a side elevational view of the structure of Figure 16 when applied over the front seat of an automobile;

Figure 20 is a view similar to Figure 19 but showing the device as applied between the seats of an automobile with the supporting means of Figure 16 reversed.

One of the problems that confronts parents of children is the number of devices which must be used when the child is quite small, i.e., when it is an infant in arms, and the additional expense which must be defrayed in purchasing other devices when the child is only a year or two older than the infant stage.

In order to properly take care of a modern day infant and to take care of the child when it has passed the infant stage, it is necessary to provide a bassinet, car bed, carriage, stroller, wagon, car seat attachment and car bed which is used for supporting the infant above the front or back, or between both seats of an automobile. The total cost necessary to provide all of these articles may be materially reduced if a single basic construction can be readily converted from one to another of the aforesaid constructions whereby when the child is an infant, certain of the articles will be used, and as the child grows these articles can be converted to other articles.

Figures 1 to 5 inclusive show the structure when used both as a carriage and stroller.

The bassinet of Figure 1 is designated as a whole by the numeral 10 and it consists of a handle 12 forming the cross bar of the uprights 14. These uprights are received in sockets 16. The sockets are rigidly attached to the spaced sides 18. In order to prevent the handles from moving too far down in the socket, the sockets are provided with a stop pin 22.

Each of the uprights has a series of notches 24, as shown in Figure 1B. There is a spaced upper side bar 26 and a lower side bar 20. The forward ends of the side bars 20 and 26 are supported by the end supports 28 each of which has a series of notches 30, and there is a socket 28a for the reception of the support 28. The notches 24 of the uprights 14 and notches 30 of the end supports 28 are adapted to be engaged by the bolts 32 which are each housed in a bolt casing 34 which are mounted at opposite ends of the lower and upper side bars. End supports 28 are removably mounted in sockets that are rigidly attached to the sides 18.

Each of the elements 12, 20, 26 and 28 are of hollow tubular construction, and the end supports 28 of these hollow members are open for the reception of a filler or spud 36, as shown in Figure 1A. These fillers are inserted in the upper end of the end supports 28, as shown in Figure 1A. The structure is provided with a front end 40 and a rear end 42.

The front and rear ends and side 18 form housings with the webs 44 shown in Figures 5 and 6 for the reception of the retractable wheels illustrated in Figures 7, 8, 11, 12, and 14.

As shown in Figure 4 the device may be converted into a stroller. This may be accomplished by attaching seat 48 to the handle bar 14, as shown in Figure 4.

In order to convert to this construction the upper side bars 26 are removed, as well as the end supports 28, the part 28 being removed from 28a. It will be appreciated that the bars 26 may be easily removed by sliding the bolts 32 and 34 to the right and left, respectively, as seen in Figure 1, whereby to permit the forward or left end of the bars 26 to slide out of the end support 28 to permit removal of each side bar 26 from its upright 14.

By reference to Figure 4 it will be noted that the rear seat 48 is provided with clamps 54, and pin 204 on the seat engages a socket in the side of the body. These rigidly position the seat with reference to the remainder of the structure. Prior to this time the end supports 28 are removed from the sockets 16.

As shown in Figure 6A a split ring 56 is provided which has an opening 58 that is large enough to slip over the sides 20. The split ring is provided with a catch 60 for holding the pivoted sides together, which sides are pivoted at 62, and the ring is provided with an auxiliary ring 64 having an opening 66 for the reception of a pin or clip, not shown, whereby to attach a cover to the ring 56 which latter is supported by the handle bar 12.

Referring to Figures 7 to 10 inclusive, a retractable wheel construction is shown in these figures wherein the front wheels 68 may be folded within the body.

Located in wells 138 at the forward ends of the body are hinges 70. The rotatable portion of each hinge is rigidly connected to the plate 72 which latter supports the spring 74 of the fork 76 of each wheel. Plate 72, as shown in Figure 7, forms part of floor 21.

The plate 72 is held in the position shown in Figure 7 by the latch mechanism shown in Figures 7 to 10. Pivotally mounted at 78 on the support 80 is the shock absorber 82. This consists of a rod 84 connected to the pivot 78 on which is slidably mounted a sleeve 86 which is forced against the transverse pin 88 by the spring 90. This pin 88 slides in a slot 92 of the sleeve 86 which is provided with a foot 96, having a reduced portion 98 and a head 100, as shown in Figure 10.

A frame 99 attached to plate 72 has an opening in which the slide plate 102 slides. This latter has a key hole slot 98 with reduced portion 101 and enlarged portion 104. The slide plate 102 is moved by handle 101 to bring the smaller portion 101 to the position shown in Figure 10 that prevents freeing head 100 from the slot. When the enlarged opening 104 is in alignment with head 100 the rod 84 may be freed from plate 72 and the parts moved to the position shown in Figure 8. The plate 72, when the wheels are lowered to the position of Figure 7, is connected to each of the shock absorbers 82 by means of the construction shown in Figures 9 and 10. When the parts 96, 84 and wheel 68 are pivoted to the position shown in Figure 8 they are held in this position by the foot 96.

Referring to Figures 11, 12, 13 and 14 it will be noted that the rear wheels 108 may also be retracted in the same manner as the wheels 68. Referring to Figures 11 and 12, each rear wheel 108 is mounted on a fork 110 which latter is attached to plate 112 whose forward end, as shown in these figures, is attached to the pivot 114. The rear end of this plate is latched in the same manner as the front wheels are latched, whereby the rear wheels may be moved from the position shown in Figure 12 to the position shown in Figure 11. The shock absorber 116 is pivoted to the side at 118, rod 120 having an enlarged head 122 forming an abutment for one end of the spring 124. The opposite end of the spring presses upon the thimble 126 of sleeve 127, the thimble being connected by the pin 128 that moves in slot 130 of sleeve 127. The connection between the rod 120 and the plate 112 is a duplicate of the structure shown in Figures 7 to 10 inclusive and therefore the details of construction have not been shown in the drawing, and the description of them is not described herein in order to avoid repetition. The foot 122′ is connected to both rods 116 and it retains the wheels 108 in their retracted position in the same manner as the construction shown in connection with the front wheel holding means.

Referring to Figures 13 and 14, the vehicle shown in Figures 1 to 8 may be readily converted to a child's wagon. In these figures the numeral 21 indicates the floor or bottom of the device. In this construction the handle bar 12 and end supports 28 are removed from their sockets. The side bars 20 remain, however, and these are utilized to bolt the wagon. Spuds 132 are inserted in the open ends of these side bars. The spuds are each provided with a pivot 134 to which is pivotally connected the U-shaped handle 136. The diameter of the end supports 28, as shown in Figure 1 is less than the internal diameter of the lower side bars 20, and, as shown in Figures 13 and 14, the interior of these side bars forms a housing for these end supports 28.

It will be noted from Figure 13 that the structure, whether it be converted to a carriage, bassinet, stroller or wagon is provided with wells 138 for the reception of the wheels when they are in retracted position. The handle 136 is also provided with a socket at each end for the reception of the spuds 140 which extend from the pivot 134. These are all friction fit connections.

Substantially all of the structure shown in Figures 13 and 14 may be utilized when the device is to be converted to a bassinet for an infant or young child, as shown in Figures 15 and 16. In Figures 15 and 16 the handle 136 has been slid in rearwardly within the lower side bars 20, and the curved hand hold 142 has been utilized to hook over the top of the back seat 144 of an automobile. Into the forward portions of the lower side bars 20 has been slid the end supports 28, which as shown in this figure is of U-shaped construction. The end support is held in an adjusted position on the top of the front 146 by the vertically moving bolts 148 which is held in the bolt casing 150 and which is mounted on vertically extending members 28a. These bolts extend into the holes 30 which are shown in Figures 1A and 1B. The U-shaped handle 136 is also held in proper adjustment by bolt 152 which moves upwardly in bolt casing 154, as shown in Figure 16.

The structure can be converted into a bassinet for nursery use as shown in Figures 17, 18 and 18A. In this form the structure shown is the same as that illustrated in Figures 15 and 16 except that the parts 28 and 136 are removed and a framework including the uprights 156 are substituted therefor. The framework that includes these uprights is provided with feet 158 and horizontally extending portions 160, which, with the plates 162, form shelves. The upper horizontally extending portions 160 may be used as a cloth rack or other supporting means. The uprights 156 are connected by several transverse members 164 and their tops are turned at right angles, as indicated at 166 so that they enter into the upper side bars 20, as shown in these figures. The device thereby becomes a nursery bassinet for a small child.

As shown in Figures 16, 19 and 20 the bassinet may be used without the framework shown in Figures 17 and 18. In this construction, and referring particularly to Figure 19, the hook shaped rods 168 extend through the upper side bars 20, with the hook 170 extending over the top of the front seat and the opposite straight end 172 resting on the dash board 174.

Referring to Figure 20, the rods 168 have been reversed so that the hook 170 extends over the front seat 176 and the straight portion 172 extends over the rear seat 178. Figure 16 shows the hook as extending over the back seat, the structural details being more fully shown in this figure than in Figures 19 and 20.

It will be obvious to those skilled in the art that various changes may be made in the invention without departing

What is claimed is:

1. A combined structure for infants and small children comprising a body having a plurality of sides, a bottom, a plurality of retractible wheels, means pivotally mounting each of said wheels on said body whereby each of said wheels may be moved from a retracted position in said body to ground supporting position, said last named means including a pivotally movable member mounting each wheel, means supporting each wheel in ground supporting position including shock absorber means comprising a rod pivoted to said body, a sleeve slidable on said rod and a spring surrounding said rod in engagement with said sleeve, a head on the end of said sleeve, said head having means for detachably engaging said pivotally movable member when said wheel is in ground supporting position.

2. The structure of claim 1 wherein said pivotally mounted movable member includes a slidable plate for engaging said head means.

3. The structure of claim 2 wherein said plate is provided with a keyhole slot for engaging said head means.

4. The structure of claim 1 wherein said body is provided with a plurality of corners forming the juncture of each pair of sides, a socket in each corner and an upright removably supported in each socket.

5. The structure of claim 4 wherein a plurality of side bars are provided, said side bars being integrally mounted on said sockets above said body sides whereby to increase the effective height of said body sides.

6. The structure of claim 5 wherein said side bars are provided with hollow ends and removable end supports adapted to be slidably received in the hollow ends of said side bars.

7. A combined structure for infants and small children comprising a body having a plurality of sides, a bottom, a plurality of retractible wheels, means pivotally mounting each of said wheels on said body whereby each of said wheels may be moved from a retracted position in said body to ground supporting position, said last named means including a pivotally movable member mounting each wheel, means supporting each wheel in ground supporting position including shock absorber means comprising a rod pivoted to said body, a slidable member on said rod and a spring surrounding said rod in engagement with said slidable member, an attaching means on the end of said slidable member, said attaching means having means for detachably engaging said pivotally movable member when said wheel is in ground supporting position.

8. The structure of claim 7 wherein said pivotally mounted movable member includes a slidable plate for engaging said attaching means.

9. The structure of claim 8 wherein said plate is provided with a keyhole slot for engaging said attaching means.

10. The structure of claim 7 wherein said body is provided with a plurality of corners forming the juncture of each pair of sides, a socket in each corner and an upright removably supported in each socket.

11. The structure of claim 10 wherein a plurality of side bars are provided, said side bars being integrally mounted on said sockets above said body sides whereby to increase the effective height of said body sides.

References Cited in the file of this patent

UNITED STATES PATENTS

| | | |
|---|---|---|
| 296,379 | Bailey | Apr. 8, 1884 |
| 800,471 | McGill | Sept. 26, 1905 |
| 1,305,388 | Luria | June 3, 1919 |
| 1,442,733 | Paschoal | Jan. 16, 1923 |
| 1,466,376 | Hrachovina | Aug. 28, 1923 |
| 1,732,520 | Leatherman | Oct. 22, 1929 |
| 2,134,904 | Bacon | Nov. 1, 1938 |
| 2,481,382 | Bennett | Sept. 6, 1949 |
| 2,509,103 | Lewis | May 23, 1950 |
| 2,581,279 | Muri | Jan. 1, 1952 |
| 2,604,333 | Elmer | July 22, 1952 |
| 2,605,811 | Zorandvich | Aug. 5, 1952 |
| 2,645,502 | Collins et al. | July 14, 1953 |

FOREIGN PATENTS

| | | |
|---|---|---|
| 261,316 | Switzerland | Aug. 16, 1949 |
| 672,192 | Great Britain | May 14, 1953 |